United States Patent
Kang et al.

(10) Patent No.: US 6,299,432 B1
(45) Date of Patent: Oct. 9, 2001

(54) MOLD FOR FORMING A HOUSING OF A CARD EDGE CONNECTOR WITH REINFORCED CORE PINS

(75) Inventors: Yuh-Huey Kang; Chien-Sen Huang, both of Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/318,706

(22) Filed: May 26, 1999

(51) Int. Cl.⁷ ....................................................... B28B 7/28
(52) U.S. Cl. ......................... 425/577; 249/175; 249/176; 425/468
(58) Field of Search .................................... 425/577, 468, 425/DIG. 10, DIG. 58; 249/175, 176

(56) References Cited

U.S. PATENT DOCUMENTS

| | | | |
|---|---|---|---|
| 5,584,728 | * | 12/1996 | Cheng .................................... 439/637 |
| 5,672,069 | * | 9/1997 | Cheng et al. ......................... 439/160 |
| 5,761,805 | * | 6/1998 | Guyer ...................................... 29/883 |
| 5,766,033 | * | 6/1998 | Davis ..................................... 239/405 |
| 5,897,889 | * | 4/1999 | Shao ...................................... 425/577 |
| 6,080,000 | * | 6/2000 | Baker et al. .......................... 439/326 |
| 6,106,337 | * | 8/2000 | Yu et al. ............................... 439/637 |
| 6,113,404 | * | 9/2000 | Choy .................................... 439/160 |

* cited by examiner

*Primary Examiner*—Nam Nguyen
*Assistant Examiner*—Emmanuel Luk
(74) *Attorney, Agent, or Firm*—Wei Te Chung

(57) ABSTRACT

A mold for forming a dielectric housing for a card edge connector, wherein the housing has an elongated body defining a central slot for receiving a lower edge of a memory module. The elongated body has two lateral ends each formed with a tower for pivotably receiving an ejector for latching or ejecting the memory module received by the connector. A number of contact passageways are defined beside the slot for receiving a number of contacts therein for electrically engaging with golden fingers on the lower edge of the memory module. The mold has a gate located proximate to a lateral end face of one of the towers of the housing to be formed by the mold, and a number of core pins in the cavity for forming the contact passageways. The core pins located nearest to the gate have a cross section larger than that of the other core pins so that they are strong enough to withstand a fluctuation of a high pressure for injecting molten plastics into the mold.

4 Claims, 4 Drawing Sheets

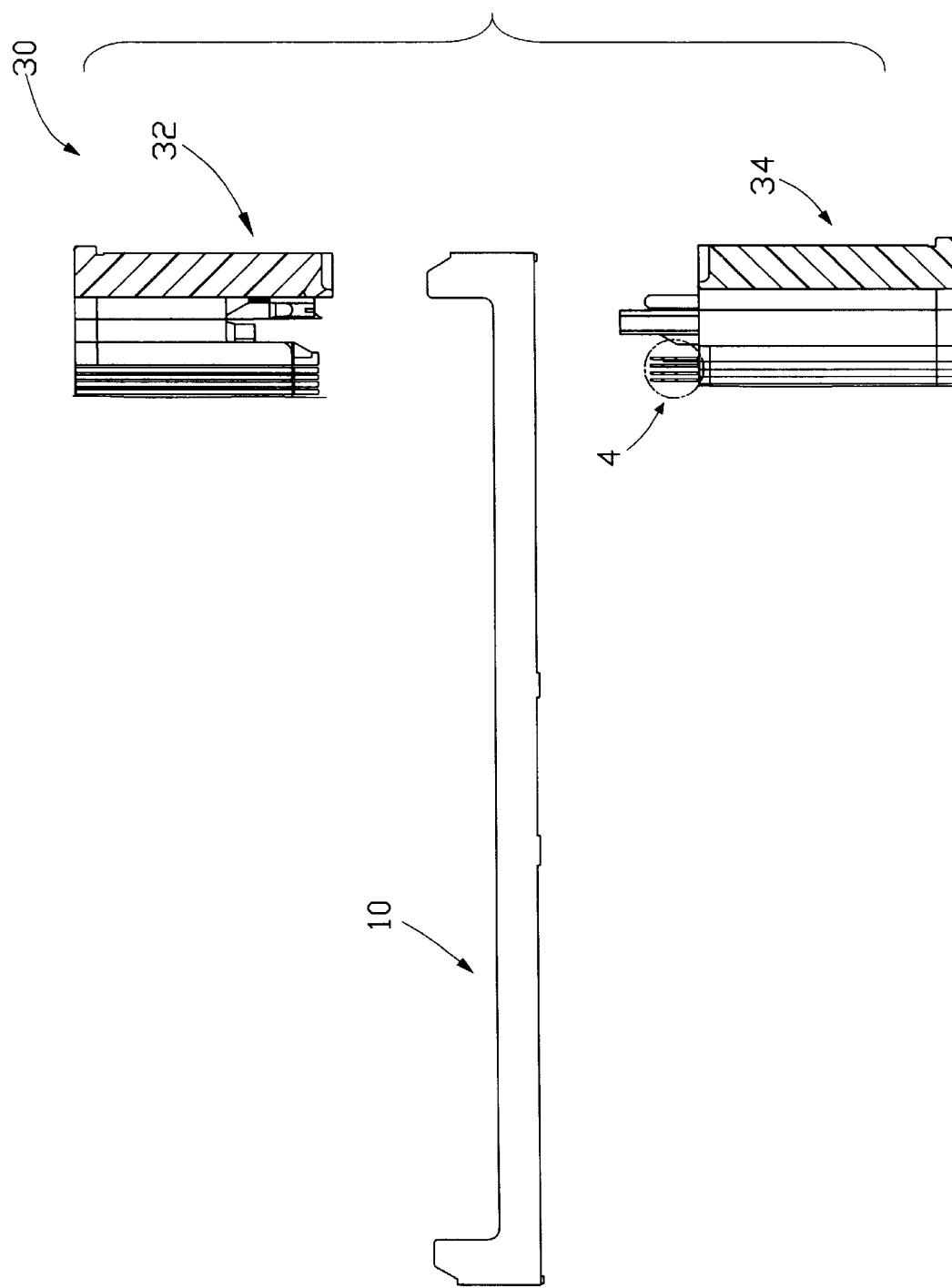

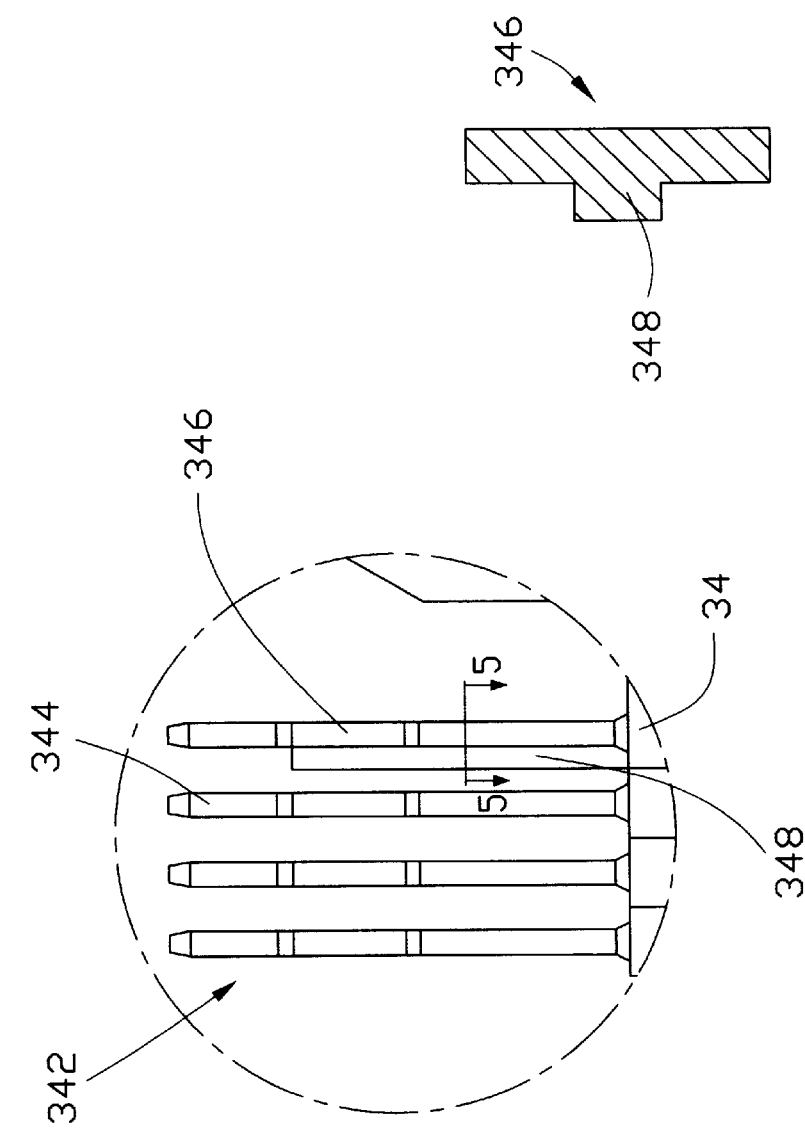
FIG.5
FIG.4
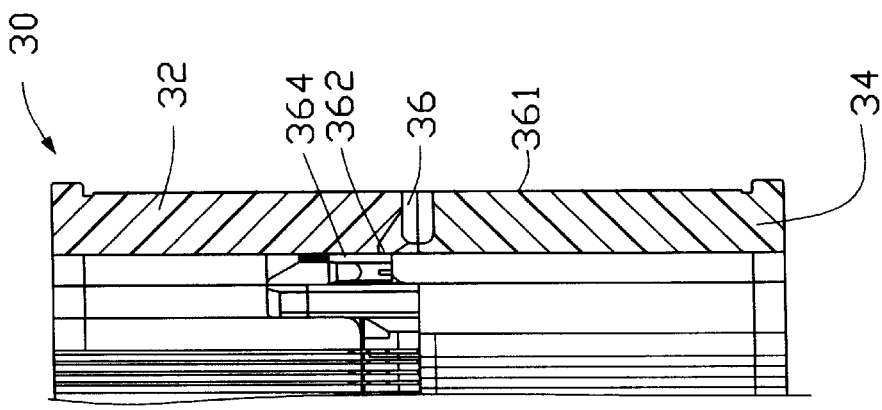
FIG.3

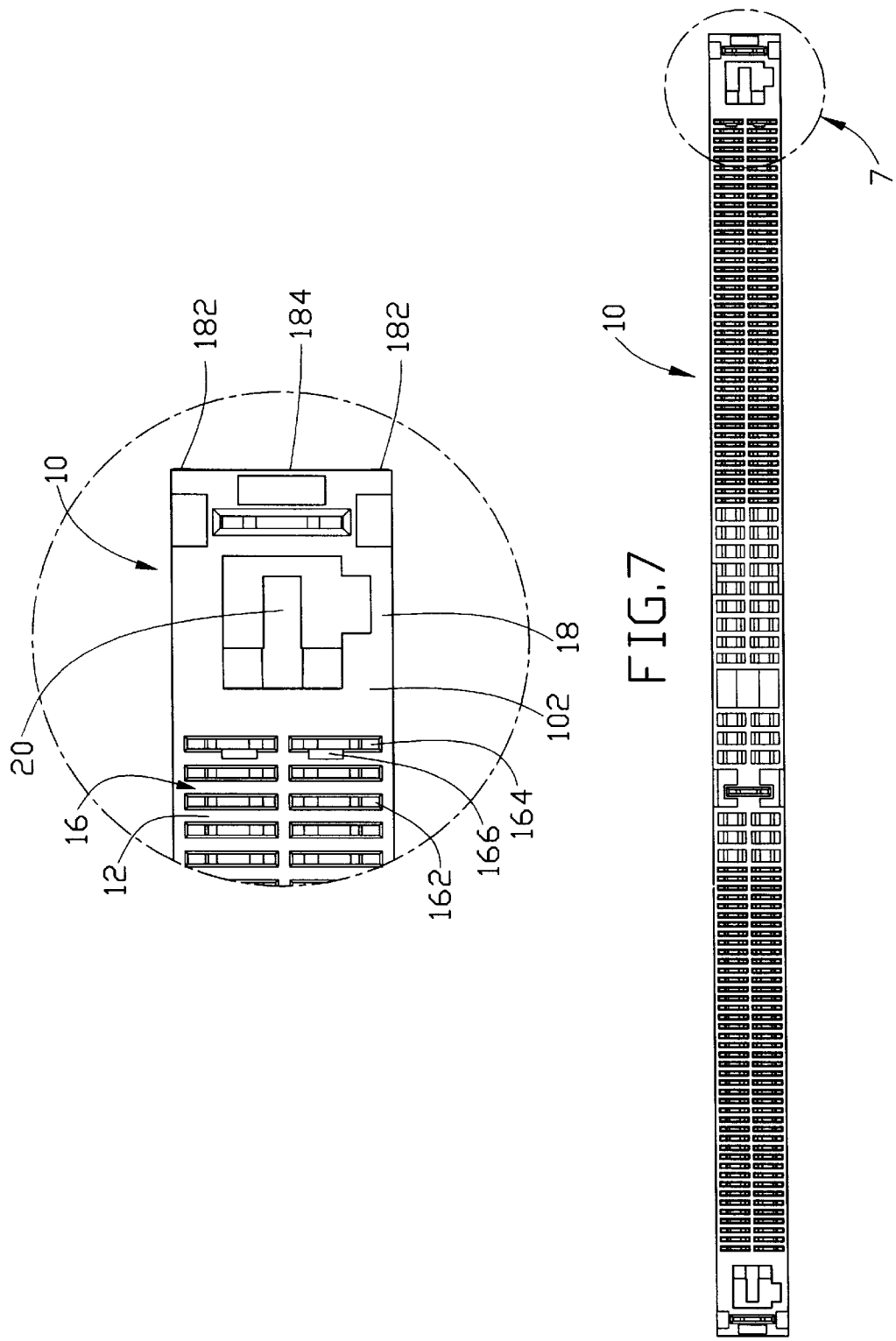

MOLD FOR FORMING A HOUSING OF A CARD EDGE CONNECTOR WITH REINFORCED CORE PINS

BACKGROUND OF THE INVENTION

FIELD OF THE INVENTION

The present invention generally relates to a mold for forming a housing of a card edge connector and a housing obtained by the mold.

A housing of a card edge connector, for example, a DIMM (Dual In-Line Memory Module) connector or an advanced RIMM (Rambus Interface Memory Module) connector, has an elongate body defining a central slot for receiving a lower side of a memory module. A number of pairs of contact passageways are defined in the housing beside the central slot for receiving corresponding contacts which have contact portions extending into the slot to electrically engage with the memory module inserted into the connector. To help the memory module to be correctly inserted into the connector, two towers each defining a guiding groove are formed at two lateral ends of the elongate body of the housing. To help the memory module to be securely received by the connector and easily ejected from connector, two ejectors each having a latch about its upper end and a kicker about its lower end are pivotably mounted in the towers.

To form the contact passageways, a mold for forming the housing by plastics injection molding needs a number of core pins mounted in a mold cavity of the mold in a cantilevered manner. Each core pin has a thin cross section along a longitudinal direction of the mold cavity. Furthermore, to help the major faces of the body of the housing to be integral and aesthetic, a gate of the mold are set about a lateral end face of one of the towers which causes the plastics injection needing to be under a large pressure whereby the plastics can flow through a space of the mold cavity for forming the elongate body to fill a space for forming the opposite tower. In combination of the factors of the large injection pressure and the thin cross section of the core pins, the core pins located near the gate of the mold become easily deflected or dislocated when the injection pressure fluctuates. The deflected or dislocated core pins cause the formed corresponding contact passageways to be irregular in shape, whereby when the corresponding contacts are received in the contact passageways, the contacts deviate from their true positions. Thus, the connector cannot have a precise electrical connection, with the memory module, resulting in a poor electronic data transmission between the two devices.

Hence, an improved mold for forming a housing of a card edge connector is needed to eliminate the above mentioned defects of current art.

SUMMARY OF THE INVENTION

Accordingly, an objective of the present invention is to provide a mold for forming an elongate housing of a card edge connector. The housing has two lateral end faces. The mold has a number of cantilevered core pins in a mold cavity of the mold for forming contact passageways of the housing. A core pin located near the gate of the mold has a cross section larger than that of the other core pins whereby the core pin located near the gate is strong enough to withstand a fluctuation of a high plastics injection pressure for injecting molten plastics into the mold cavity via the gate for forming the housing. When forming the housing, the gate is located closely adjacent to one of the lateral end faces of the housing.

BRIEF DESCRIPTION OF THE DRAWINGS

FIG. 2 is an elevational view of a portion of a mold for forming the housing of FIG. 1 and the housing, wherein the mold is at an open position and expressed in a cross-sectional manner;

FIG. 3 is a view of the mold similar to FIG. 2, in a closed position and an enlarged scale;

FIG. 4 is an enlarged view of a part of FIG. 2 indicated by circle "4";

FIG. 5 is an enlarged cross-sectional view taken alone line 5—5 of FIG. 4

FIG. 6 is a bottom view of FIG. 1; and

FIG. 7 is an enlarged view of a part of FIG. 5 indicated by circle "7".

DETAILED DESCRIPTION OF THE PREFERRED EMBODIMENT

Figure 1:
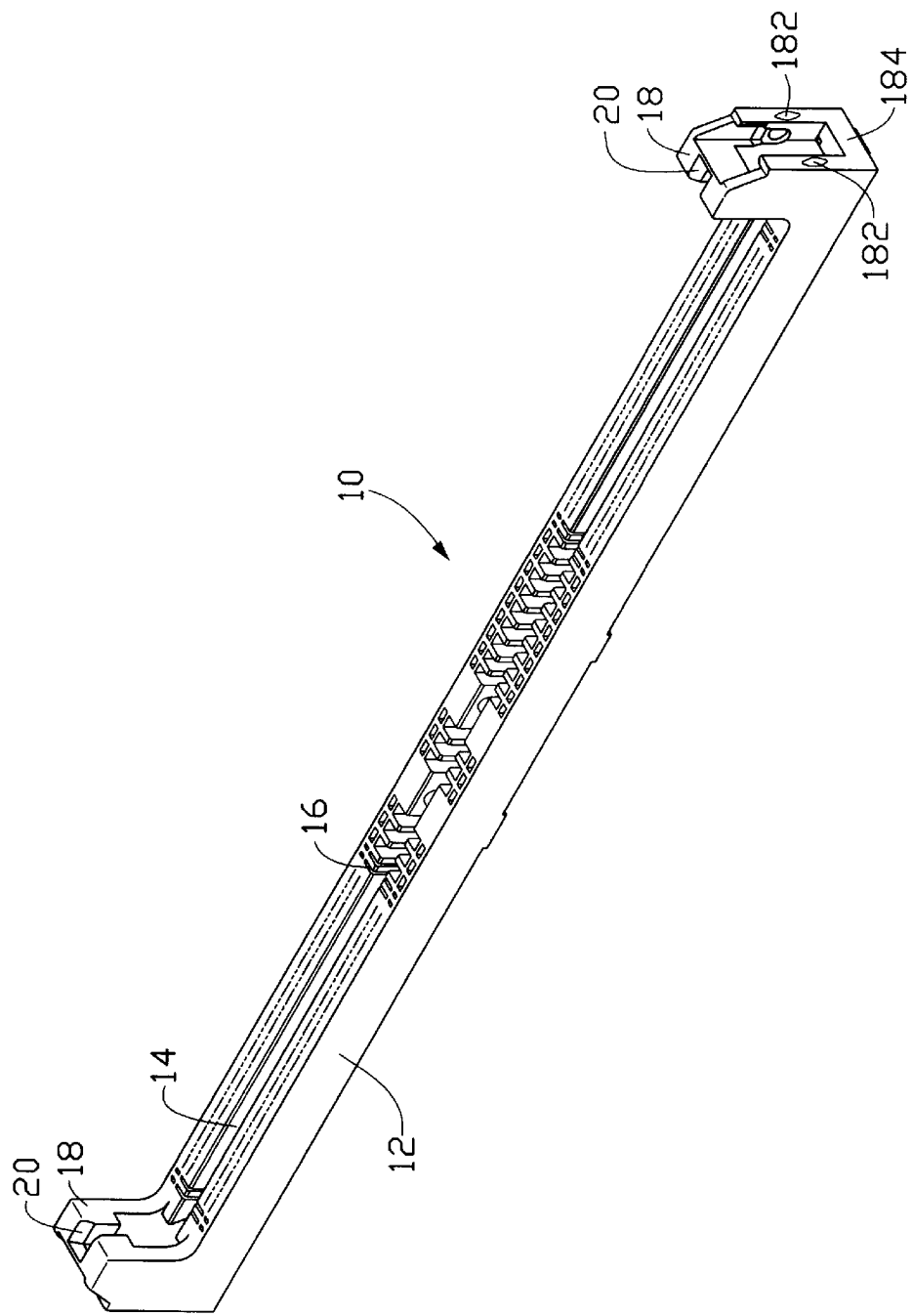
FIG. 1 is a perspective view of a housing of a card edge connector in accordance with the present invention.

Reference will now be made in detail to the preferred embodiment of the present invention.

Referring to FIG. 1, a housing 10 of a card edge connector in accordance with the present invention has an elongated body 12 and two towers 18 upright projecting from two lateral ends of the body 12. The body 12 defines a central slot 14 along a longitudinal direction thereof for receiving a lower edge of a memory module (not shown), and a number of contact passageways 16 beside the slot 14 for interferentially receiving a corresponding number of contacts (not shown) therein. These contacts engage with golden fingers on the lower edge of the module inserted into the connector thereby creating an electrical connection between the connector and the module. Each tower 18 is used for pivotably receiving an ejector (not shown) therein for latching or ejecting the module received by the connector. A groove 20 is formed in an inner face of each tower 18 for guiding the insertion of the lower edge of the memory module into the slot 14.

Referring to FIGS. 2 and 3, a portion of a mold 30 in accordance with the present invention for forming the housing 10 is shown in a cross-sectional manner. As the other portion of the mold is well known by those skilled in the art, it is not shown herein. The mold 30 includes an upper half 32 and a lower half 34. When the mold 30 is closed, a runner 36 is formed from a lateral end face 361 of the mold 30 along a parting line (not labeled) between the upper and lower halves 32, 34. The runner 36 then extends through the upper half 32 to enter a cavity 364 formed by the closed mold 30 via a gate 362 in the upper half 32. The cavity 364 is used for forming the housing 10 by injecting molten plastics therein to via the gate 362. Also referring to FIGS. 4 and 5, a number of core pins 342 for forming the contact passageways 16 of the housing 10 are fixed to the lower half 34 in a cantilevered fashion. Each core pin 342 projects into the cavity 364. The core pins 342 consist of two core pins 346 (only one shown) which are located nearer to the gate 362 than the other core pins 344. The core pins 346 each are integrally formed with a reinforcing portion 348 at a side thereof distant from the gate 362 to increase an area of a cross section of the core pin 346 along a longitudinal direction of a part of the cavity 364 for forming the elongate body 12 of the housing 10. Thus, the core pins 346 are strong enough to withstand the fluctuation of the high pressure for injecting molten plastics into the mold 30 to form the housing 10.

Referring to FIGS. 6 and 7, it can be clearly seen that the contact passageways 16 of the housing 10 formed by the core pins 342 of the mold 30 in accordance with the present invention have different sizes. Due to the reinforcing portions 348 of the core pins 346, two corresponding contact passageways 164 located nearest to one of the towers 18 that the gate 362 of the mold 30 is proximate to during the forming of the housing 10 each have a size larger than that of the other contact passageways 162, as viewed from a bottom 102 of the housing 10. The bottom 102 is adapted to be proximate to a printed circuit board to which the connector is soldered. In the preferred embodiment, the gate 362 is proximate to a lateral end face 184 of the corresponding tower 18 of the housing 10 about opposite front and rear parts thereof; thus, two irregularities 182 (also referring to FIG. 1) are formed at the lateral end face 184 of the corresponding tower 18 by the gate 362. As the reinforced portion 348 of each core pin 346 nearest to the gate 362 has a rectangular cross section, each contact passageway 164, in comparison with the other passageways 162, has an increased section 166 with a corresponding rectangular configuration as viewed from the bottom 102 of the housing 10. From FIG. 6, it is clearly seen that the increased section 166 is located at a side of the contact passageway 164 distant from the irregularities 182.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A mold for forming an elongate housing of a card edge connector, the housing defining a central slot for receiving a lower edge of an electronic module, a number of contact passageways beside the slot for receiving a number of contacts therein for electrically engaging with the electronic module and two lateral end faces located at opposite ends of the central slot, the mold comprising a gate at one of the lateral end faces of the housing through which molten plastic for forming the housing is injected into a cavity of the mold, and a number of core pins in the cavity for forming the contact passageways, wherein at least a core pin which is nearer to the gate than other core pins has a cross section larger than those of the other core pins for enhancing strength thereof to withstand a high injection pressure of the molten plastic, and comprises a reinforcing portion extending in a longitudinal direction of the cavity whereby the corresponding core pin is strong enough to withstand a fluctuation of a pressure for injecting molten plastic into the mold to form the housing of the connector.

2. The mold in accordance with claim 1, wherein the reinforcing portion is located on a side of the corresponding core pin opposite from the direction of the gate.

3. The mold in accordance with claim 2, wherein the reinforcing portion has a rectangular shape.

4. The mold in accordance with claim 1, wherein the core pins extend into the cavity in a cantilevered manner.

* * * * *